(12) United States Patent
Feng et al.

(10) Patent No.: US 6,181,468 B1
(45) Date of Patent: Jan. 30, 2001

(54) COMPOSITE INFRARED WINDOWS FABRICATED BY DIRECT BONDING

(75) Inventors: Tom Feng, Hopewell Junction, NY (US); Joel Askinazi, Trumbull, CT (US)

(73) Assignee: Raytheon Company, Lexington, MA (US)

( * ) Notice: Under 35 U.S.C. 154(b), the term of this patent shall be extended for 0 days.

(21) Appl. No.: 08/340,676

(22) Filed: Nov. 16, 1994

(51) Int. Cl.$^7$ .................................................. G02B 5/08
(52) U.S. Cl. .......................... 359/350; 359/359; 250/226; 427/154
(58) Field of Search .................................... 359/350, 359, 359/360; 250/226; 338.1; 156/99, 60, 94; 65/36, 37, 41; 428/446, 469, 698, 699, 704, 336, 428, 432, 450, 913; 427/154

(56) References Cited

U.S. PATENT DOCUMENTS

| | | | |
|---|---|---|---|
| 4,311,743 | * 1/1982 | Kasper et al. | 428/64 |
| 4,778,731 | * 10/1988 | Kraatz et al. | 428/623 |
| 5,007,689 | * 4/1991 | Kelly et al. | 359/350 |
| 5,067,781 | * 11/1991 | Montanari et al. | 359/350 |
| 5,120,602 | * 6/1992 | Tustison et al. | 428/336 |
| 5,194,985 | * 3/1993 | Hilton, Sr. | 359/350 |
| 5,441,803 | 8/1995 | Meissner . | |

* cited by examiner

Primary Examiner—Darren Schuberg
(74) Attorney, Agent, or Firm—William C. Schubert; Glenn H. Lenzen, Jr.

(57) ABSTRACT

A method of fabricating an infrared (IR) window (50) which has a high transmittance at IR frequencies includes the steps of providing a protective layer (52) and an IR substrate (54) each having a high IR transmittance. An inner surface (66) of the protective layer (52) and an outer surface (72) of the IR substrate (54) are contacted without adhesive therebetween. The protective layer (52) and the IR substrate (54) are annealed at a bonding temperature. Anti-reflection coatings (73), (74) can be applied to an outer surface (68) of the protective layer (52) and to an inner surface (70) of the IR substrate (54). The IR window (50) can be installed as a shield for an IR sensor mounted on an aircraft. The IR window (50) can be removed from the aircraft and the protective layer (52) and the IR substrate (54) can be debonded by heating the IR window (50) above the bonding temperature. The protective layer (52) and the IR substrate (54) can be separated and a new protective layer (52) can be provided. An inner surface 66 of the new protective layer (52) and an outer surface (72) of the IR substrate (54) can be contacted at ambient temperature without adhesive therebetween. The new protective layer (52) and the IR substrate (54) can be annealed at a bonding temperature.

14 Claims, 2 Drawing Sheets

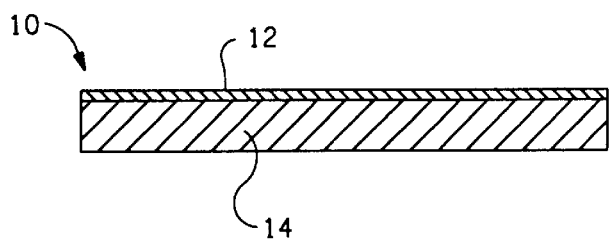
FIG. 1
PRIOR ART
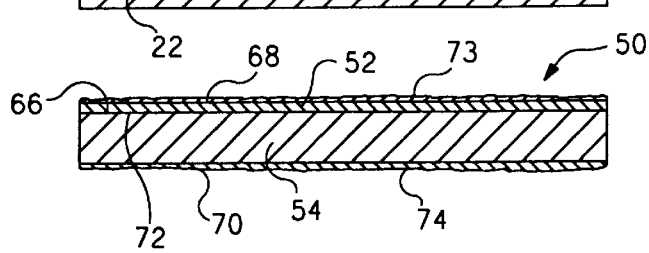
FIG. 2
PRIOR ART
FIG. 3
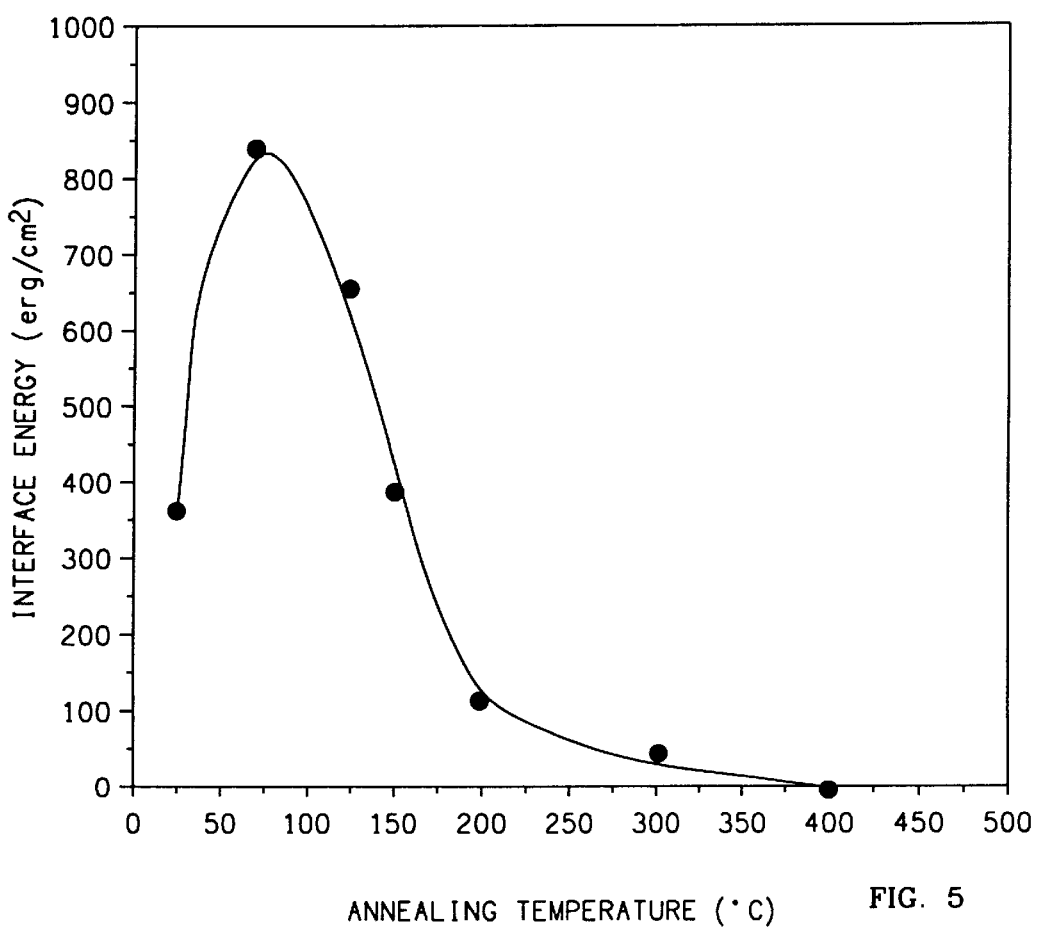
FIG. 5

COMPOSITE INFRARED WINDOWS FABRICATED BY DIRECT BONDING

BACKGROUND OF THE INVENTION

1. Technical Field

This invention relates to infrared windows and, more particularly, to fabrication of composite infrared windows by direct bonding.

2. Discussion

Conventional infrared (IR) windows for airborne applications lack high-speed sand and rain impact durability and, as a result, experience cumulative surface and subsurface damage which results in large optical transmittance loss. Repair or replacement of the IR window is expensive and time consuming.

Conventional IR windows rely primarily on two approaches to harden an outer surface thereof against high-speed rain and sand impact. In a first approach, a protective coating, for example boron phosphide (BP) or gallium phosphide (GaP), is deposited on top of an IR substrate. Although the protective coating substantially improves the durability of the IR window, cumulative damage still occurs both in the protective coating as well as in the IR substrate. Repair of IR windows fabricated according to the first approach is expensive and time consuming due to the difficulty of removing the protective coating completely and the need to repolish and recoat the IR substrate.

According to a second approach, a protective layer is bonded to an IR substrate using an adhesive to form the IR window. For example, a chalocogenide glass bonds a diamond film to a zinc sulfide (ZnS) substrate. Alternately, an organic polymer adhesive bonds a diamond film to a germanium (Ge) substrate. However, the intermediate bonding layer must satisfy stringent optical, thermal and mechanical requirements. Furthermore, it is difficult to remove the bonding material completely when replacement of the protective layer is required due to high-speed rain and sand impact. In addition, chalcogenide glasses are extremely toxic and difficult to handle during fabrication.

Therefore, an IR window which provides improved high-speed sand and rain impact durability and which can be repaired easily and at low cost would be desirable.

SUMMARY OF THE INVENTION

A method of fabricating an infrared (IR) window which has high optical transmittance at IR frequencies includes the steps of providing a protective layer having a high IR transmittance and an IR substrate having a high IR transmittance. An inner surface of the protective layer and an outer surface of the IR substrate are contacted without adhesive therebetween. The protective layer and the IR substrate are annealed at a bonding temperature.

According to another feature of the invention, particles are removed from at least one of the inner surface of the protective layer and the outer surface of the IR substrate to ensure good bonding.

According to still another feature of the invention, an anti-reflection coating is applied to an outer surface of the protective layer and an anti-reflective coating is applied to an inner surface of the IR substrate.

According to still another feature of the invention, the IR window is installed as a shield for an IR sensor used in a harsh environment. The IR window and IR sensor can be mounted on an aircraft.

According to yet another feature of the invention, the protective layer is replaced when cumulative surface damage has occurred. The IR window is removed from the aircraft. The protective layer and the IR substrate are debonded by heating the IR window above the bonding temperature. The protective layer and the IR substrate are separated. A new protective layer is provided. An inner surface of the new protective layer and an outer surface of the IR substrate are contacted at ambient temperature without adhesive therebetween. The new protective layer and the IR substrate are then annealed at a bonding temperature.

According to yet another feature of the invention, an infrared (IR) window according to the invention has a high transmittance at IR frequencies and includes a protective IR-transparent layer directly bonded to an IR-transparent substrate without adhesive therebetween.

According to another feature of the invention, particulates are removed from at least one of an inner surface of the protective IR-transparent layer and an outer surface of the IR-transparent before the IR transparent layer and the IR-transparent substrate are connected together.

Still other objects, features and advantages will be readily apparent.

BRIEF DESCRIPTION OF THE DRAWINGS

The various advantages of the present invention will become apparent to those skilled in the art after studying the following specification and by reference to the drawings in which:

FIG. 1 illustrates a cross-sectional view of a first IR window made in accordance with a first prior art approach;

FIG. 2 illustrates a cross-sectional view of a second IR window made in accordance with a second prior art approach;

FIG. 3 illustrates a cross-sectional view of an IR window according to the present invention;

FIG. 5 is a graphical illustration of interface energy (or bond strength) as a function of annealing temperature for an exemplary embodiment of the present invention.

DETAILED DESCRIPTION

Figure 4:
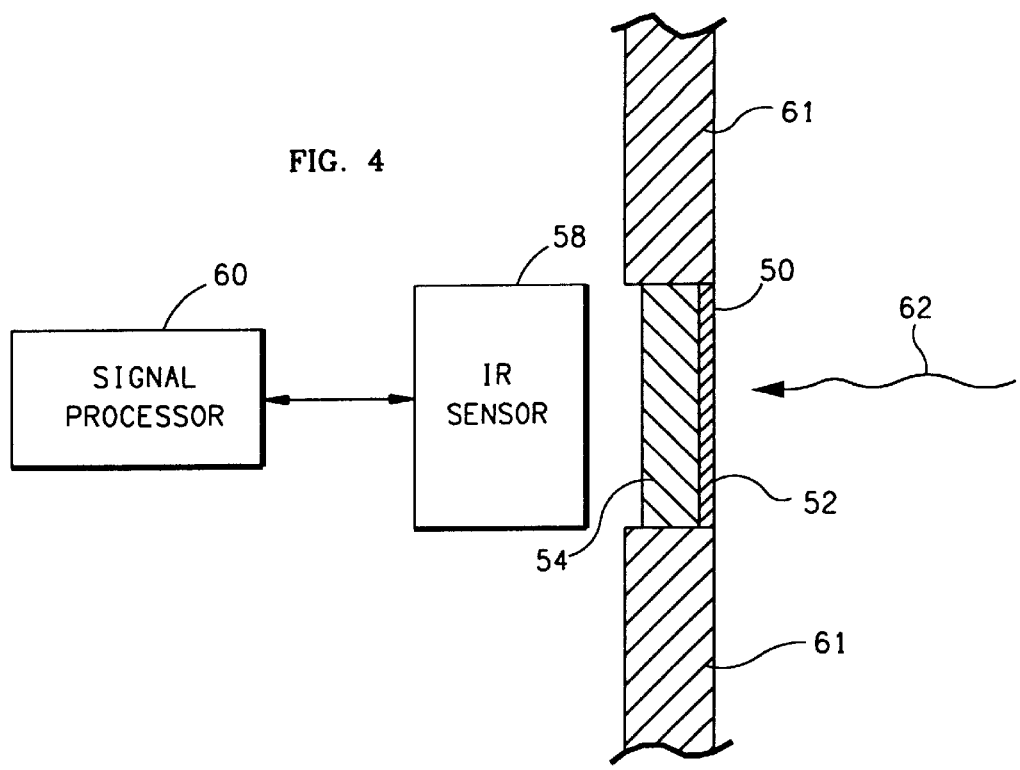
FIG. 4 illustrates the IR window of FIG. 3 installed as a shield for IR sensing electronics in an aircraft.

Referring to FIG. 1, a first infrared (IR) window 10 according to the prior art is illustrated and includes a protective coating 12 deposited on an IR substrate 14. Although protective coating 12 substantially improves the high-speed rain and sand impact durability of IR window 10, cumulative damage still occurs to both protective coating 12 and IR substrate 14 during use. Repair of IR window 10 is expensive and time consuming due to the difficulty of removing protective coating 12 completely and due to the need to repolish and recoat IR substrate 14.

Referring to FIG. 2, a second IR window 20 according to the prior art is illustrated and includes an IR substrate 22, a protective layer 24 and a bonding material 26 located therebetween. For example, protective layer 24 can be a diamond film, bonding material 26 can be chalocogenide glass, and IR substrate 22 can be zinc sulfide (ZnS). Alternately, IR substrate 22 can be germanium (Ge), protective layer 24 can be a diamond film, and bonding material 26 can be an organic polymer adhesive. However, bonding material 26 must satisfy stringent optical, thermal and mechanical requirements. Therefore, fabrication of conventional IR window 20 is costly. Furthermore, it is difficult to remove bonding material 26 completely when replacement of protective layer 24 is required. In addition, chalocogenide glass is toxic and otherwise difficult to handle.

Referring to FIG. 3, a highly improved IR window 50 according to the present invention is illustrated and includes a protective layer 52 and an IR substrate 54. FIG. 4 illustrates an example implementation of IR window 50 as a shield for an IR sensor 58 connected to a signal processor 60. IR window 50 is mounted in an outer structure 61 of an aircraft with protective layer 52 in an outwardly facing position. Infrared rays 62 travel through IR window 50 and impinge upon IR sensor 58. For example, IR sensor 58 and signal processor 60 can be associated with reconnaissance, target acquisition, or target detection and tracking electronics. Skilled artisans can appreciate IR window 50 has numerous other applications. IR window 50 can be utilized in any situation requiring high IR transmittance and high durability when exposed to particle impact.

Protective layer 52 can be silicon (Si). Skilled artisans can appreciate that other materials with high IR transmittance can be employed. IR substrate can be zinc sulfide and after "ZnS", zinc sellenium (ZnSe), germanium (Ge), gallium arsenide (GaAs) and other IR materials or combinations thereof. Still other materials having high IR transmittance can be employed as IR substrate 54. Protective layer 52 includes an inner surface 66 and an outer surface 68. IR substrate 54 includes an inner surface 70 and an outer surface 72. IR window 50 illustrated in FIG. 3 is fabricated in two steps. An inner surface 66 of protective layer 52 is brought into contact with an outer surface of IR substrate 54 at room temperature. Subsequently, protective layer 52 and IR substrate 54 are annealed at a higher temperature to increase bonding strength thereof.

In theory, direct room temperature bonding is possible between any pair of materials as long as the following conditions are met. First, the mating surfaces, in other words inner surface 66 of protective layer 52 and outer surface 72 of IR substrate 54, should be sufficiently flat and smooth. Second, the mating surfaces should be clean and free of particulates. Third, the van der Waals attractive forces between atoms on the two mating surfaces should be sufficiently strong. In general, hydrogen bonding results in a much stronger van der Waals force. Therefore, hydrophilic surfaces are preferred over hydrophobic. Stronger hydrogen bonding also decreases the flatness and smoothness requirements of the mating surfaces.

To increase the bonding strength, the roomtemperature bonded protective layer 52 and IR substrate 54 are annealed at higher temperatures. When bonding dissimilar materials, the maximum annealing temperature is limited by a difference between the coefficients of thermal expansion (CTE) of protective layer 52 and IR substrate 54. However, this annealing temperature limitation is exploited in debonding protective layer 52 and IR substrate 54 to repair IR window 50, as will be described below.

Particles a few micrometers in diameter trapped between two bonding surfaces can result in bubbles (in other words unbonded areas) several millimeters in diameter. Therefore, for bubble-free bonding, particles should be removed from bonding surfaces prior to contacting inner surface 66 of protective layer 52 and outer surface 72 of IR substrate 54. This can be accomplished by performing the bonding in a dust-free room typically employed in microelectronics fabrication. Alternately another approach called a "micro-clean room" can be employed. This approach is discussed in detail in "semiconductor wafer bonding: recent developments", Q.-Y. Tong and U. Gösele, Materials Chemistry and Physics, 37 (1994), 101–127, hereby incorporated by reference.

In a highly preferred embodiment, IR window 50 is fabricated using silicon (Si) as protective layer 52 and zinc sulfide (ZnS) as IR substrate 54. Silicon is more durable and costs less than zinc sulfide (ZnS). To improve the overall IR transmittance of IR window 50, outer surface 68 of protective layer 52 can be coated with an anti-reflection (AR) coating 73, for example a multilayer hard carbon. An inner surface 70 of IR substrate 54 can be coated with a standard AR coating 74 after bonding. Skilled artisans can appreciate that the AR coatings can be applied before or after bonding. Preferably, silicon protective layer 52 is made sufficiently thick, for example 0.25–1.0 millimeters (mm), so that any cumulative environmental damage, due to for example sand and rain erosion, will be confined to silicon protective layer 52. When significant cumulative damage has occurred to the silicon protective layer 52, it can be debonded from the ZnS substrate 54 by heating to a temperature sufficiently higher than the initial bonding temperature. This debonding will occur spontaneously when the elastic strain energy of the bonded surfaces (originating from the relatively large difference in the CTE of Si and ZnS) exceeds the bonding energy.

The fabrication of an exemplary embodiment of IR window 50 is described below. Employing a micro-cleanroom set up, a silicon wafer (protective layer 52) with a diameter of 50 mm and a thickness of 0.25 mm is directly bonded to a zinc sulfide (ZnS) substrate (IR substrate 54) with a diameter of 50 mm and a thickness of 1 mm. The silicon protective layer is a standard prime-grade single-crystal wafer which is chemical-mechanically polished to a root-mean-square (RMS) microroughness of a few Angstroms (Å). The polycrystalline ZnS optical substrate with $\mu$m-sized crystallites was made by the chemical vapor deposition (CVD) process and was obtained from Morton International. The ZnS substrate was mechanically polished to a RMS microroughness of ~30–40 Å. The microroughness values of the Si and ZnS samples were measured by atomic force microscopy (AFM) using a Digital Instrument Nanoscope III instrument. Prior to bonding, the silicon wafer was cleaned by the standard RCA solutions, whereas the ZnS optical substrate was cleaned by successive rinsing in a series of organic solvents.

Spacers are employed to separate the two precleaned wafers with a gap of ~1.5 mm. Highly-filtered deionized water at a pressure of ~20 psi was flushed through the gap to remove any remaining particulates. After placing a transparent cover over the wafers, the wafers were spin-dried at 3000 rpm for 5 minutes while being heated with a 250 W IR lamp. During this spindrying step, the temperature of the mating materials approached 80–90° C. Immediately after drying, the two wafers were brought into contact by simultaneously removing spacers separating the wafers. Room-temperature bonding was then initiated by exerting a slight pressure at a center point of the wafers. Once initiated, a contacting wave (with a speed of several cm/s) is spread radially outward over the entire wafer pair to remove any trapped air. The progression of the contacting wave and the quality of the room-temperature bond are preferably viewed with an infrared imaging system.

The bonding strength of the pair is inferred from measuring the interface energy of the bonded pair by the crack-opening method. As shown in FIG. 5, the interface energy is a function of the annealing temperature. A peak in the interface energy of 842 erg/cm$^2$ was obtained after annealing the sample at 65° C. for 50 hours. Annealing at higher temperatures led to lower measured interface energies. This reduction in bonding strength at temperatures above 65° C. is due to the large difference in the coefficients of thermal expansion (CTE) between Si ($2.3\times10^{-6}$/° C.) and ZnS ($6.6\times10^{-6}$/° C.). After annealing at 150° C. for 43 hours (with a heating and cooling rate of 3 ° C/min.), some partial debonding started to occur at the edges of the wafer pair. Upon further heating, the bonding strength continued to decrease, and at 400° C. the wafers separated with no apparent surface damage. This spontaneous delamination resulted when the elastic strain energy of the pair (originating from the relatively large mismatch in the CTE of the two materials) had exceeded the bonding energy.

As can be appreciated from the foregoing, a seemingly negative result (limitations on the maximum bonding temperature due to the large difference in CTEs of protective layer 52 and IR substrate 54) is being used to allow debonding of protective layer 52. When significant cumulative damage has occurred to protective layer 52 due to sand and rain impact, protective layer 52 is debonded by heating IR window 50 to a temperature sufficiently higher than the bonding temperature. A new protective layer 52 can be bonded to an undamaged original IR substrate 54. The basic concept of bonding, debonding, and rebonding to produce a low-cost, replaceable IR window 50 is illustrated further in FIG. 5. FIG. 5 graphically illustrates interface energy as a function of annealing temperature for the above-described exemplary embodiment including a silicon protective layer and a zinc sulfide substrate. Interface energy (or bond strength) increases with increasing annealing temperature until a maximum is reached. As annealing temperature is further increased, interface energy (or bonding strength) decreases so that protective layer 52 and IR substrate 54 can be easily separated.

Figure 6:
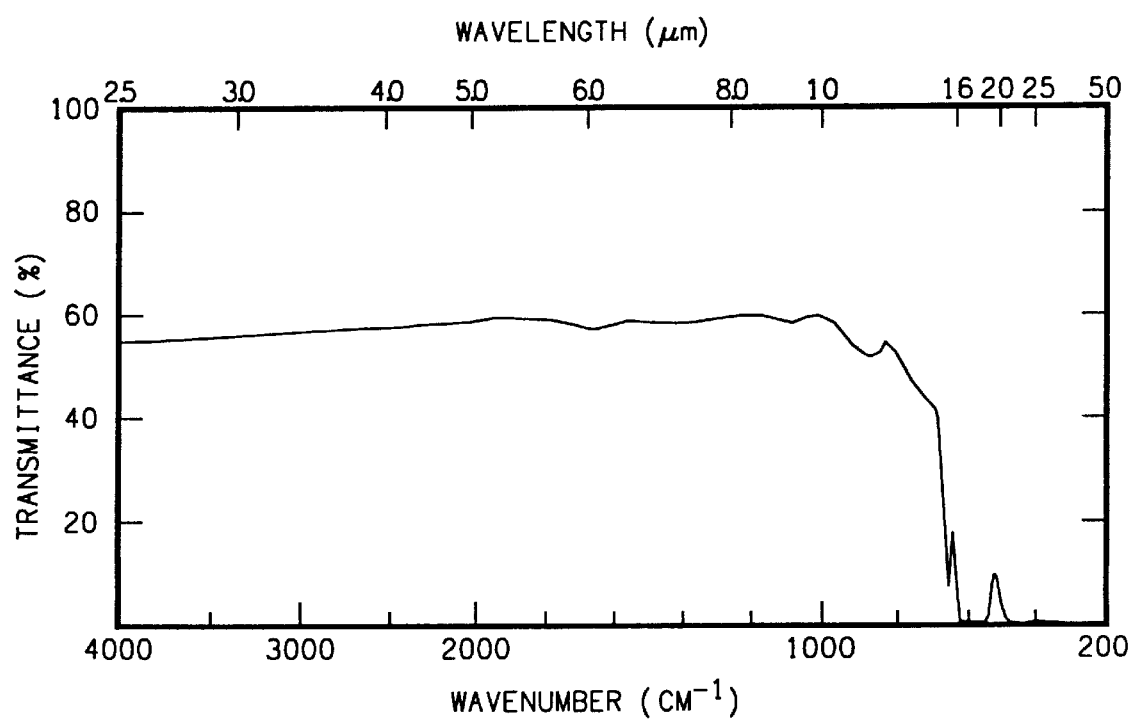
FIG. 6 is a graphical illustration of transmittance as a function of wavelength for the exemplary embodiment of the present invention.

Referring to FIG. 6, IR transmittance is graphically illustrated as a function of wavelength. FIG. 6 illustrates the wavelength from 2.5–50 micrometers for the above-described exemplary embodiment with a silicon protective layer and a zinc sulfide substrate. As can be appreciated from FIG. 6, the IR transmittance of the exemplary IR window resembles mainly that of zinc sulfide because the silicon wafer has a thickness of only 0.25 millimeters. Substantial increase in the transmittance of the exemplary IR window can be obtained using AR coatings on outer surface 68 of protective layer 52 and inner surface 70 of IR substrate 54.

As can be appreciated from the foregoing, IR window 50 according to the present invention is a high-durability IR window design suitable for high-speed rain and sand impact environments. IR window 50 employs a highly durable, protective layer 52 directly bonded to a reusable IR substrate 54 which will not only significantly harden current long-wave IR window materials such as zinc sulfide (ZnS), zinc sellenium (ZnSe), geranium (Ge), gallium arsenide (GaAs), and other IR materials, it will also make it possible to repair IR window 50 at a fraction of the cost of a new replacement window. IR window 50 according to the present invention also does not require any bonding material between protective layer 52 and IR substrate 54 such as organic polymer adhesives and chalocogenide glasses. Intermediate bonding layers must satisfy stringent optical, thermal and mechanical requirements which increases the cost of fabricating IR windows.

The various advantages of the present invention will become apparent to those skilled in the art after a study of the foregoing specification and following claims.

What is claimed is:

1. A method of fabricating and maintaining an infrared (IR) window installed as a shield for an IR sensor used in a harsh environment, said IR window having a high transmittance at IR frequencies, comprising the steps of:

providing a protective layer;

providing an IR transparent substrate;

contacting an inner surface of said protective layer and an outer surface of said IR transparent substrate without adhesive therebetween;

annealing said protective layer and said IR transparent substrate at a bonding temperature;

monitoring said protective layer for cumulative surface damage; and debonding said protective layer and said IR transparent substrate by heating said IR window above said bonding temperature after sufficient cumulative surface damage has occurred.

2. The method of claim 1 further comprising the step of:

removing particles from at least one of said inner surface of said protective layer and said outer surface of said IR transparent substrate.

3. The method of claim 1 further comprising the step of:

applying an antireflection coating to an outer surface of said protective layer.

4. The method of claim 1 further comprising the step of:

applying an antireflection coating to an inner surface of said IR transparent substrate after said annealing step.

5. The method of claim 1 wherein said IR window and IR sensor are mounted on an aircraft.

6. The method of claim 1 further comprising the steps of:

providing a new protective layer;

contacting an inner surface of said new protective layer and an outer surface of said IR substrate at ambient temperature without adhesive therebetween;

annealing said new protective layer and said IR substrate at a bonding temperature.

7. The method of claim 1 wherein the bonding surface of at least one of said protective layer and said IR substrate is hydrophilic.

8. The method of claim 1 wherein said protective layer and said IR substrate have different coefficients of thermal expansion.

9. The method of claim 1 wherein said step of contacting is performed in a micro-cleanroom setup.

10. The method of claim 1 wherein said step of contacting occurs at room temperature.

11. A method of fabricating an infrared (IR) window which has a high transmittance at IR frequencies comprising the steps of:

providing a protective layer;

providing an IR substrate;

contacting an inner surface of said protective layer and an outer surface of said IR transparent substrate without adhesive therebetween; and annealing said protective layer and said IR substrate at a bonding temperature, wherein said protective IR layer includes silicon and said IR substrate includes at least one of zinc sulfide, zinc selenium, germanium, and gallium arsenide.

12. A method of fabricating an infrared (IR) window which has a high transmittance at IR frequencies comprising the steps of:

providing a protective layer;

providing an IR substrate;

contacting an inner surface of said protective layer and an outer surface of said IR transparent substrate without adhesive therebetween; and annealing said protective layer and said IR substrate at a bonding temperature, wherein said protective layer has a thickness of approximately 0.25–1.0 millimeters.

13. A method for fabricating an infrared (IR) window having a high transmittance at IR frequencies, comprising the steps of:

providing a protective IR-transparent layer made of a first material;

providing an IR-transparent substrate made of a second material distinct from said first material and having a different coefficient of thermal expansion than said first material;

contacting said protective IR-transparent layer and said IR-transparent substrate without adhesive therebetween to allow direct bonding at room temperature;

annealing said protective IR-transparent layer and said IR-transparent substrate at a bonding temperature;

positioning said IR window in an environment subject to particle impact;

removing the protective IR-transparent layer, after cumulative surface damage has occurred, by heating said IR window above said bonding temperature.

14. The method of claim 13 further comprising the step of:

repeating the contacting and annealing steps with said IR-transparent substrate and a new protective IR-transparent layer.

* * * * *